US010320906B2

(12) United States Patent
Slik

(10) Patent No.: US 10,320,906 B2
(45) Date of Patent: Jun. 11, 2019

(54) SELF-ORGANIZING STORAGE SYSTEM FOR ASYNCHRONOUS STORAGE SERVICE

(71) Applicant: NetApp, Inc., Sunnyvale, CA (US)

(72) Inventor: David Anthony Slik, Northridge, CA (US)

(73) Assignee: NetApp, Inc., Sunnyvale, CA (US)

( * ) Notice: Subject to any disclaimer, the term of this patent is extended or adjusted under 35 U.S.C. 154(b) by 351 days.

(21) Appl. No.: 15/143,098

(22) Filed: Apr. 29, 2016

(65) Prior Publication Data

US 2017/0318094 A1    Nov. 2, 2017

(51) Int. Cl.

| G06F 15/16 | (2006.01) |
| H04L 29/08 | (2006.01) |
| H04L 12/24 | (2006.01) |
| G06F 3/06  | (2006.01) |

(52) U.S. Cl.
CPC ........ *H04L 67/1097* (2013.01); *G06F 3/0607* (2013.01); *G06F 3/067* (2013.01); *G06F 3/0631* (2013.01); *H04L 41/12* (2013.01)

(58) Field of Classification Search
None
See application file for complete search history.

(56) References Cited

U.S. PATENT DOCUMENTS

| 5,926,649 | A | 7/1999 | Ma et al. |
| 6,260,125 | B1 | 7/2001 | McDowell |
| 6,336,135 | B1 | 1/2002 | Niblett et al. |
| 7,747,730 | B1 * | 6/2010 | Harlow ................ H04L 41/048 709/224 |
| 2007/0168336 | A1 * | 7/2007 | Ransil .................. G06F 16/958 |
| 2015/0263978 | A1 * | 9/2015 | Olson ..................... G06F 9/505 709/226 |

(Continued)

FOREIGN PATENT DOCUMENTS

| WO | 2013165382 A1 | 11/2013 | |
| WO | WO-2013165382 A1 * | 11/2013 | ........... G06F 3/0604 |
| WO | WO 2013165382 A1 * | 11/2013 | ........... G06F 3/0604 |

OTHER PUBLICATIONS

International Search Report & Written Opinion, Application Serial No. PCT/US2017/030470, dated Aug. 24, 2017, 12 pgs.

(Continued)

*Primary Examiner* — Phyllis A Book
(74) *Attorney, Agent, or Firm* — Cesari and McKenna, LLP

(57) ABSTRACT

An archival cloud storage service can be created with cost efficient components for large scale data storage and can efficiently use these components. A frontend of the cloud storage service presents an asynchronous storage interface to consuming devices of the cloud storage service. Providing an asynchronous storage service interface avoids at least some of the state data overhead that accompanies a time constrained interface (e.g., a request-response based interface with timeouts in seconds). Backend nodes of the cloud storage service periodically query the frontend servers to select requests that the backend nodes can fulfill. Each backend node selects requests based on backend characteristics information, likely dynamic characteristics, of the backend node. Thus, the storage system underlying the cloud storage service can be considered a self-organizing storage system.

19 Claims, 9 Drawing Sheets

(56) References Cited

U.S. PATENT DOCUMENTS

2016/0179711 A1* 6/2016 Oikarinen ............... G06F 3/061
                                                                     710/40

OTHER PUBLICATIONS

Muhleisen., "Query Processing in Self-Organized Storage Systems", Freie Universitat Berlin, retrieved on Apr. 12, 2016 from http://ceur-ws.org/Vol-623/paper07.pdf, 2011, 5 pages.

Tang; et al., "A Self-Organizing Storage Cluster for Parallel Data—Intensive Applications", IEEE Computer Society Washington, DC, SC '04 Proceedings of the 2004 ACM/IEEE conference on Supercomputing, retrieved on Apr. 12, 2016 from http://www.supercomputing.org/sc2004/schedule/pdfs/pap283.pdf, 2004, 13 pages.

* cited by examiner

SELF-ORGANIZING STORAGE SYSTEM FOR ASYNCHRONOUS STORAGE SERVICE

BACKGROUND

The disclosure generally relates to the field of data storage, and more particularly to an asynchronous storage interface.

A cloud service provider provides a cloud service to a cloud service consumer. One type of cloud service is a cloud storage service. While cloud storage service refers to the service of providing cloud storage, the Storage Networking Industry Association (SNIA) formally defines cloud storage as a synonym for data storage as a service ("DSaaS"). SNIA defines DSaaS as delivery of virtual storage and related services over a network. The virtual storage and related service are configured according to cloud consumer requests, typically expressing a requested service level. A cloud consumer device interacts with a DSaaS according to a defined interface that resides above or leverages communication protocols. SNIA has defined the Cloud Data Management Interface (CDMI) as an interface for both control and data paths. A cloud consumer device can also consume a cloud storage service according to a client-server model based interface, such as a Representational State Transfer based interface ("RESTful interface").

BRIEF DESCRIPTION OF THE DRAWINGS

Aspects of the disclosure may be better understood by referencing the accompanying drawings.

DESCRIPTION

Figure 1:
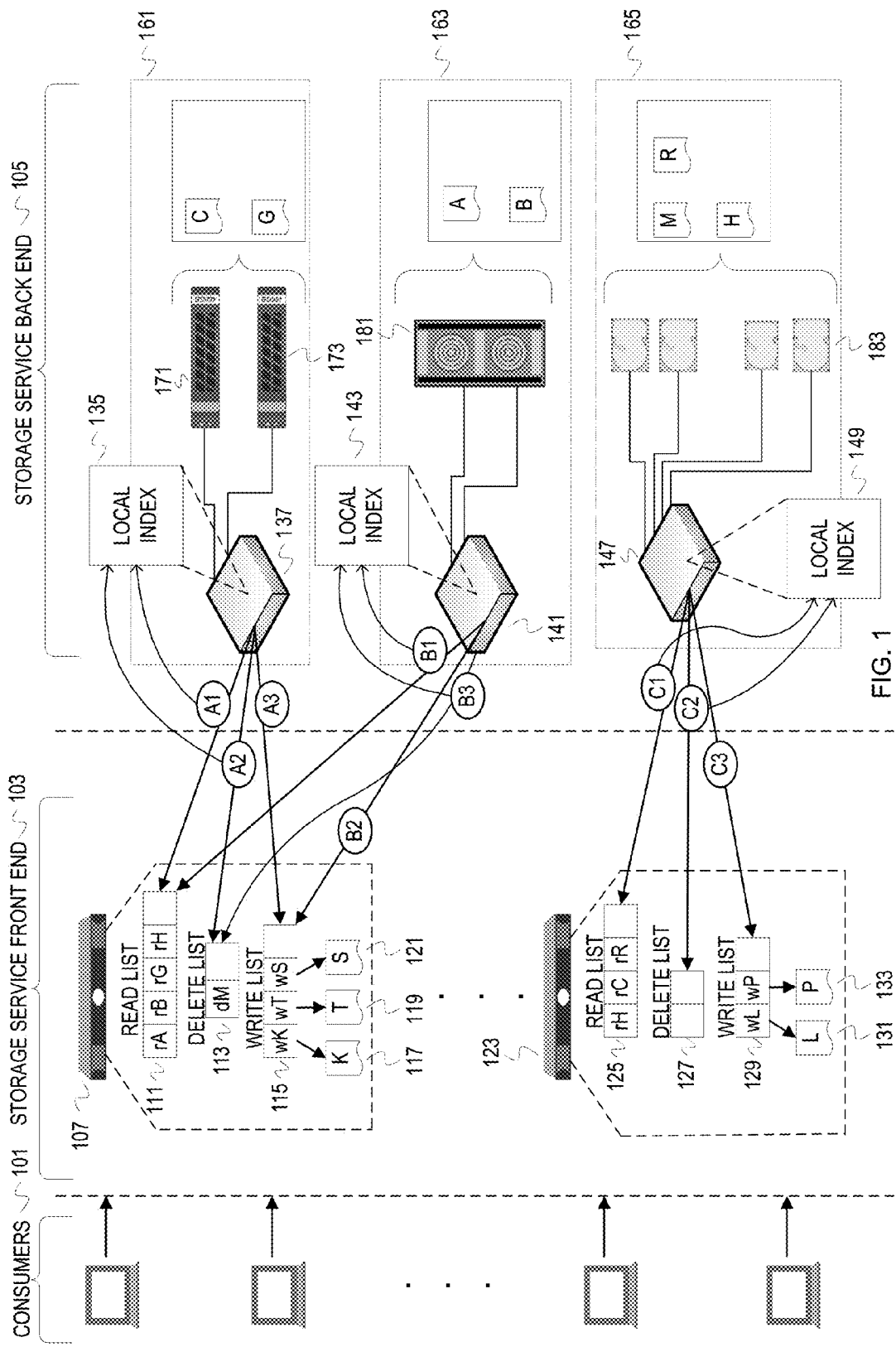
FIG. 1 is a conceptual diagram of a self-organizing storage system of a cloud storage service.

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

Introduction

Formally, "cloud service consumer" refers to a person or organization that uses or consumes a cloud service. However, software executing on a device facilitates a person or organization consuming or using a cloud storage service. The device can be described as using the cloud storage service and/or interacting with components of a cloud storage service. Thus, this description will refer to a cloud service consumer device.

A cloud service consumer device communicates requests to a cloud storage service according to a defined interface for the cloud storage service. The interface defines a request-response type of exchange between the cloud service consumer device and the cloud storage service. The client facing side of the cloud storage service (i.e., frontend) services requests by maintaining a map(s) to locate data to be read or deleted. The frontend also determines where data will be stored. Typically, the frontend maintains state data to ensure responses are provided to cloud service consumer devices in an appropriate time as defined by the interface. However, a significant use of a cloud storage service is to archive data. "Digitally archived data" refers to long retention periods (e.g., decades) and corresponding access patterns (i.e., infrequently accessed and acceptance of high access latency). With less demanding access patterns, a cloud storage provider will use less costly storage system components for digitally archived data and cloud storage consumers accept responses that can take substantially more time than seconds (e.g., days).

Overview

A cloud storage service can be created with cost efficient components for large-scale archival data storage and can efficiently use these components. A frontend of the cloud storage service presents an asynchronous storage interface to consuming devices of the cloud storage service. Providing an asynchronous storage service interface avoids at least some of the state data overhead that accompanies a time constrained interface (e.g., a request-response based interface with timeouts in seconds). Frontend servers organize requests received from the cloud service consumer devices by request type: read, write, and delete. Backend nodes of the cloud storage service periodically retrieve requests from the frontend servers to select requests that the backend nodes can fulfill. Each backend node selects requests based on backend characteristics information, likely dynamic characteristics, of the backend node. Thus, the storage system underlying the cloud storage service can be considered a self-organizing storage system.

Example Illustrations

FIG. 1 is a conceptual diagram of a self-organizing storage system of a cloud storage service. The cloud storage service is logically divided into a storage service frontend 103 and a storage service backend 105. Components of the storage service frontend 103 include software and hardware that present a storage service interface to cloud storage service consumers ("consumers") 101. The frontend components accept requests from the consumers 101 that conform to the interface (e.g., structure of requests and arguments of requests) and provide responses to the consumers when requests have been fulfilled. The storage service front end 103 maintains the requests, such as by temporary storage, but does not fulfill the requests. The storage service backend 105 retrieves requests from the storage service front end 103 and fulfills the requests according to local information, including locally maintained storage indexes.

Storage systems underlying a cloud storage service are often of a large scale. For example, a cloud storage service can comprise thousands of storage servers and storage medium devices across numerous geographical locations. To avoid complicating a figure by attempting to reflect scale, FIG. 1 only illustrates the storage service front end 103 with two storage servers 107, 123. Figure illustrates the storage service backend 105 with three "backend storage nodes" 161, 163, 165. The term "backend storage node" or "storage node" is used herein to collectively refer to a set of storage medium devices (e.g., tape drives, solid state device/flash drives, disk drives, etc.) and a network connected device that manages the storage medium devices.

Prior to the depicted stages, the storage service front end 103 has received various storage service requests. FIG. 1 depicts lists by request type at each of the servers 107, 123. The contents of each of the lists represent requests that have been received from consumers 101. The server 107 maintains a read list 111 that indicates four received read requests. These read requests are denoted as rA, rB, rG, and rH. For this illustration, the notation scheme uses a first character to indicate the type of request and the second character to indicate the object of the request. For instance, rA represents a read request for an object "A." The character "w" is used to indicate a write request and the character "d" is used to indicate a delete request. The server 107 maintains a delete list 113 that indicates a request dM. The server 107 also maintains a write list 115 that indicates write requests wK, wT, and wS. The write request wK references a data object 117 identified as object "K." The write requests wT and wS respectively reference data object 119 and data object 121. The data object 119 is identified as object "T" and the data object 121 is identified as object "S."

At stages A1-A3, the node 161 reads each of the lists 111, 113, 115 to select requests to fulfill. The node 161 comprises a storage media device controller 137 and two banks 171, 173 of flash storage. The storage media device controller 137 maintains a local storage index 135 that indicates location information of objects stored in the banks 171, 173. The storage media device controller 137 uses the local storage index 135 to access the flash storage banks 171, 173. At stage A1, the storage media device controller 137 retrieves the read list 111 from the server 107. The storage media device controller 137 determines which read requests in the read list 111 the node 161 can fulfill based on the local storage index 135. The local storage index 135 indicates that objects C and G are stored in the flash storage banks 171, 173. In response, the storage media device controller 137 selects rG to be fulfilled. At stage A2, the storage media device controller 137 retrieves the delete list 113 from the server 107. The storage media device controller 137 determines which delete requests in the delete list 113 the node 161 can fulfill based on the local storage index 135. Since the object M is not stored in the flash storage banks 171, 173, the storage media device controller 137 cannot fulfill the delete request. At stage A3, the storage media device controller 137 retrieves the write list 115 from the server 107. The storage media device controller 137 selects write requests to fulfill based on information about the node 161, as well as the write requests. The storage media device controller 137 may select a write request based on size of the object to be written, type of object to be written, and additional related service requests for the object (e.g., encryption, compression, etc.). The storage media device controller 137 may also select a write request based on available space in the flash storage banks 171, 173, power status of each of the flash storage banks 171, 173, write requests previously selected by the storage media device controller 137, availability of storage I/O for the flash storage banks 171, 173 and/or other attribute/state of the flash storage banks, etc.

At stages B1-B3, the node 163 also reads each of the lists 111, 113, 115 to select requests to fulfill. The node 163 comprises a storage media device controller 141 and a tape library 181. The storage media device controller 137 maintains a local storage index 143 that indicates location information of objects stored in the tape library 181. This index 143 could be stored on the tapes in the tape library 181 using a format like the linear tape file system (LTFS), or could be stored separately on another storage device that is part of the storage media device controller 137. The storage media device controller 141 uses the local storage index 143 to access the tape library 181. The storage media device controller 141 retrieves from the server 107 the read list 111 and the delete request list 113 at stages B1 and B2, respectively. The storage media device controller 141 determines which read requests in the read list 111 and which delete requests in the delete list 113 the node 163 can fulfill based on the local storage index 143. The local storage index 143 indicates that objects A and B are stored in the tape library 181. The storage media device controller 141 therefore selects rA and rB to be fulfilled. Since the object M is not stored in the tape library 181, the storage media device controller 141 cannot fulfill the dM. At stage B3, the storage media device controller 141 retrieves the write list 115 from the server 107. The storage media device controller 141 selects write requests to fulfill based on information about the node 163, as well as the write requests. The storage media device controller 141 may select a write request based on size of the object to be written, type of object to be written, and additional related service requests for the object (e.g., encryption, compression, etc.). The storage media device controller 141 may also select a write request based on available space in the tape library 181, current state of robotic arms of the tape library 181, availability of additional tape cartridges, tape cartridge wear, projected tape cartridge lifetime and replacement schedules, write requests previously selected by the storage media device controller 141, and/or other attribute/state of the tape cartridges and library, etc.

Although backend nodes may concurrently retrieve requests from a same server of the storage service front end 103, backend nodes likely interact with each of the front end servers at different or overlapping times. In this example illustration, the node 165 retrieves requests from the server 123 and will later retrieve requests from the server 107. Prior to stages C1-C3, the server 123 has populated request lists based on requests from the consumers 101. The server 123 maintains a read list 125 that indicates three received read requests. These read requests are rH, rC, and rR. The server 123 maintains a delete list 127, which is empty at the illustrated times. The server 123 also maintains a write list 129 that indicates write requests wL and wP. The write request wL references a data object 131 identified as object "L." The write request wP references data object 133 identified as object "P."

At stages C1-C3, the node 165 reads each of the lists 125, 127, 129 to select requests to fulfill. The node 165 comprises a storage media device controller 147 and a storage disk array 183. The storage media device controller 147 maintains a local storage index 149 that indicates location information of objects stored in the storage disk array 183. The storage media device controller 147 uses the local storage index 135 to access the storage disk array 183. At stage C1, the storage media device controller 147 retrieves the read list 125 from the server 123. The storage media device controller 147 determines which read requests in the read list 125 the node 163 can fulfill based on the local storage index 149. The local storage index 149 indicates that objects M, H, and R are stored in the storage disk array 183. Based on this information, the storage media device controller 147 selects rH and rR to be fulfilled. At stage C2, the storage media device controller 147 retrieves the delete list 127 from the server 123 and determines that the delete list is empty. At stage C3, the storage media device controller 147 retrieves the write list 129 from the server 123. The storage media device controller 147 selects write requests to fulfill based on information about the node 165, as well as the write requests. As already mentioned, the storage media device controller 147 may select a write request based on size of the object to be written, type of object to be written, and additional related service requests for the object (e.g., encryption, compression, etc.). The storage media device controller 147 may also select a write request based on available space in the storage disk array 183, health related information of the storage disk array 183 (e.g., number of writes to failure, age of disk drive, number of detected errors, etc.), write requests previously selected by the storage media device controller 147, and/or other attribute/state of the storage disk array 183, etc.

Figure 2:
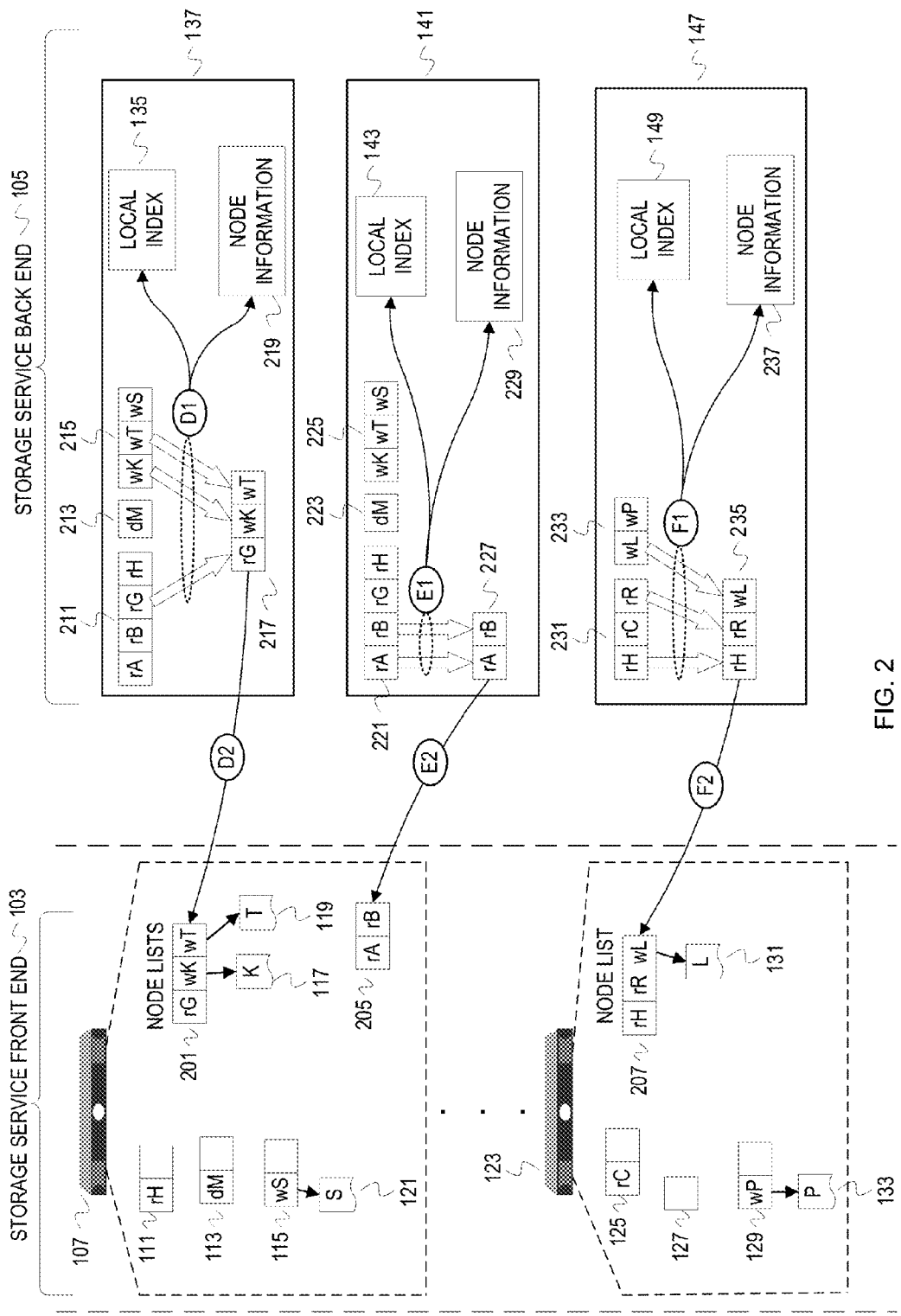
FIG. 2 depicts a conceptual diagram of the backend of the self-organizing storage system depicted in FIG. 1 creating lists of selected requests for fulfillment by the selecting backend nodes.

FIG. 2 depicts a conceptual diagram of the backend of the self-organizing storage system depicted in FIG. 1 creating lists of selected requests for fulfillment by the selecting backend nodes. FIG. 2 provides an example elaboration on the depicted retrieval of requests in FIG. 1. In FIG. 2, the backend nodes retrieve the lists from the frontend 103, create a list of selected requests for fulfillment, and complete the requests to the frontend 103. The retrieved request lists are identified with different labels to express that the retrieved versions may be different than the lists residing in the frontend 103. For instance, a write request list in the frontend 103 includes pointers to the objects to be written. A backend node initially retrieves the write list without pointers and without the objects.

At stages D1-D2, the storage media device controller 137 creates and returns a list of requests selected for fulfillment by the backend node. The storage media device controller 137 has retrieved and locally stored a read list 211, a delete list 213, and a write list 215. At stage D1, the storage media device controller 137 selects requests from the retrieved lists 211, 213, 215 to create the node specific request list 217. The controller 137 selects read and delete requests to fulfill based on the local storage index 135, and selects write requests to fulfill based on node information 219. The node information 219 represents the various attribute information and state information of the backend node that can influence selection of write requests as previously mentioned in describing FIG. 1. At stage D2, the controller 137 performs the requests in the node specific request list 217, returning results of the operations to the server 107. These requests can be performed in any order, and typically are performed in an order that is optimal for the storage media device controller 137. As part of performing the requests, the server 107 may create a version 201 of the node specific list 217 with pointers to the relevant objects, and remove the requests from the request lists 111, 113 and 115. This prevents other storage media device controllers 141 and 147 from also attempting to perform the requests. In this case, the relevant objects are objects 117, 119 for the selected write requests wK and wT.

The storage media device controller 141 performs a similar process with the request lists retrieved from the server 107. The storage media device controller 141 has retrieved and locally stored a read list 221, a delete list 223, and a write list 225. The contents of the read list 221, the delete list 223, and the write list 225 are the same as the respective request lists 211, 213, and 215 at the storage media device controller 137 in this illustration. However, requests can arrive at the storage server 107 after retrieval by the controller 137 and before retrieval by the controller 141. The arrival of new requests can change contents of the lists maintained by the server 107, and a difference in the requests retrieved by the different backend nodes. At stage E1, the storage media device controller 141 creates a node specific request list 227. The controller 141 selects read and delete requests to fulfill based on the local storage index 143, and selects write requests to fulfill based on node information 229. In FIG. 2, the controller 141 has selected rA and rB. At stage E2, the controller 141 performs the selected requests in the node specific request list 227, returning the results of the operations to the server 107. The server 107 may create a version 205 of the node specific list 227.

The storage media device controller 147 performs a similar process with request lists retrieved from the server 123. The storage media device controller 147 has retrieved and locally stored a read list 231 and a write list 233. At stage F1, the storage media device controller 147 creates a node specific request list 235. The controller 147 selects read requests to fulfill based on the local storage index 149, and selects write requests to fulfill based on node information 237. In FIG. 2, the controller 147 has selected rH, rR, and wL to fulfill. At stage F2, the controller 147 performs the selected requests in the node specific request list 235, returning the results of the operations to the server 123. The server 123 may create a node specific request list 207 based on the node specific list 235. The node specific request list 207 includes a pointer to the object 131 for the write request wL.

The annotations of FIGS. 1 and 2 (A1-A3, D1-D2, etc.) each represent stages of one or more operations. Although these stages are ordered for these examples, the stages do not capture every example and should be used to aid in understanding this disclosure and should not be used to limit the claims. Subject matter falling within the scope of the claims can vary with respect to the order and some of the operations.

FIGS. 1-2 illustrate different types of storage media for the storage nodes of the storage system underlying the cloud storage service. The different types of media are depicted to illustrate that the self-organizing backend nodes of a cloud storage service are not constrained by media type, although the variation is not necessary. However, a self-organizing storage system can be used by a cloud storage service provider to allow the backend nodes to efficiently organize data across the storage system according to media specific node information.

Figure 3:
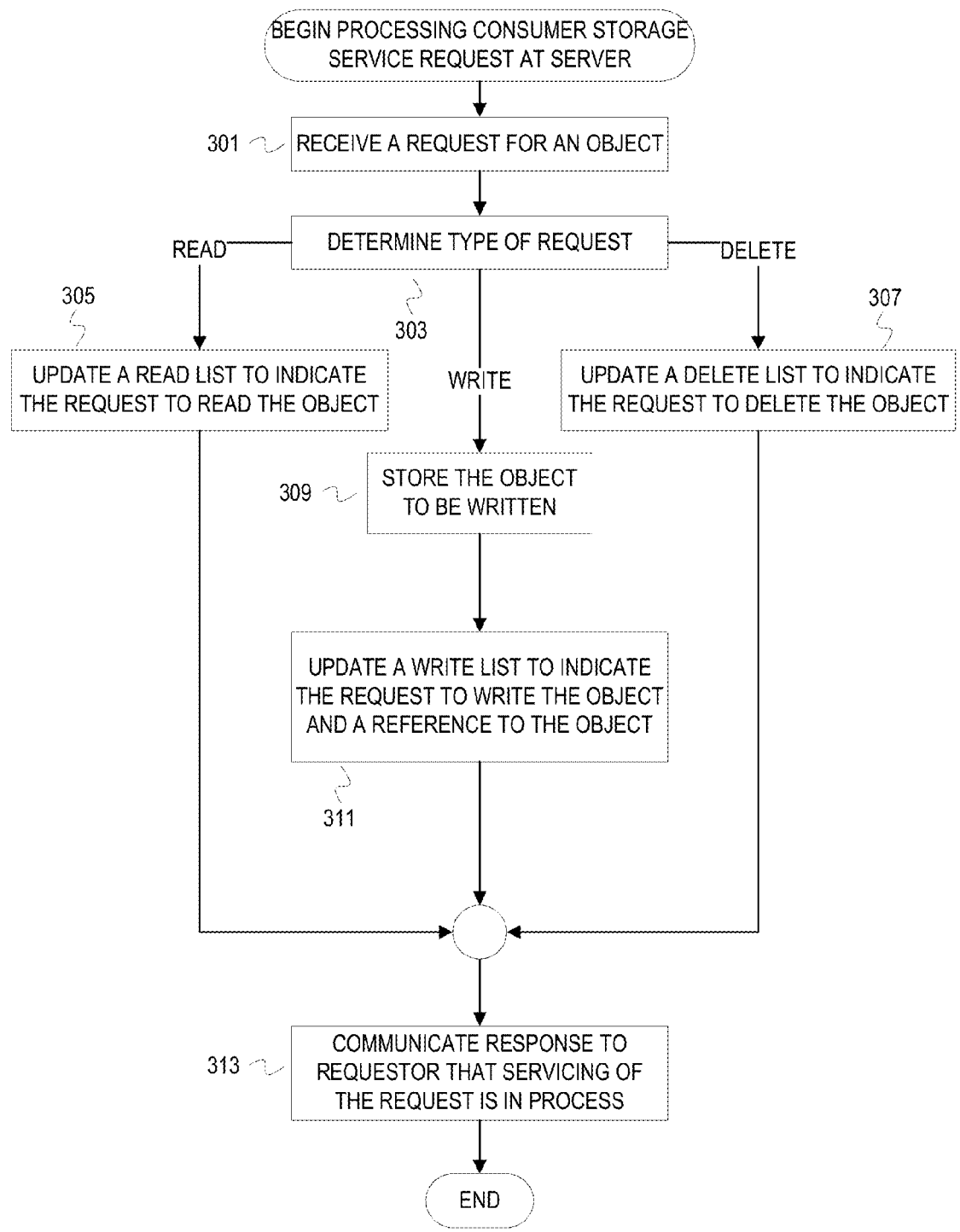
FIG. 3 depicts a flowchart for processing a cloud service consumer storage request.
Figure 4:
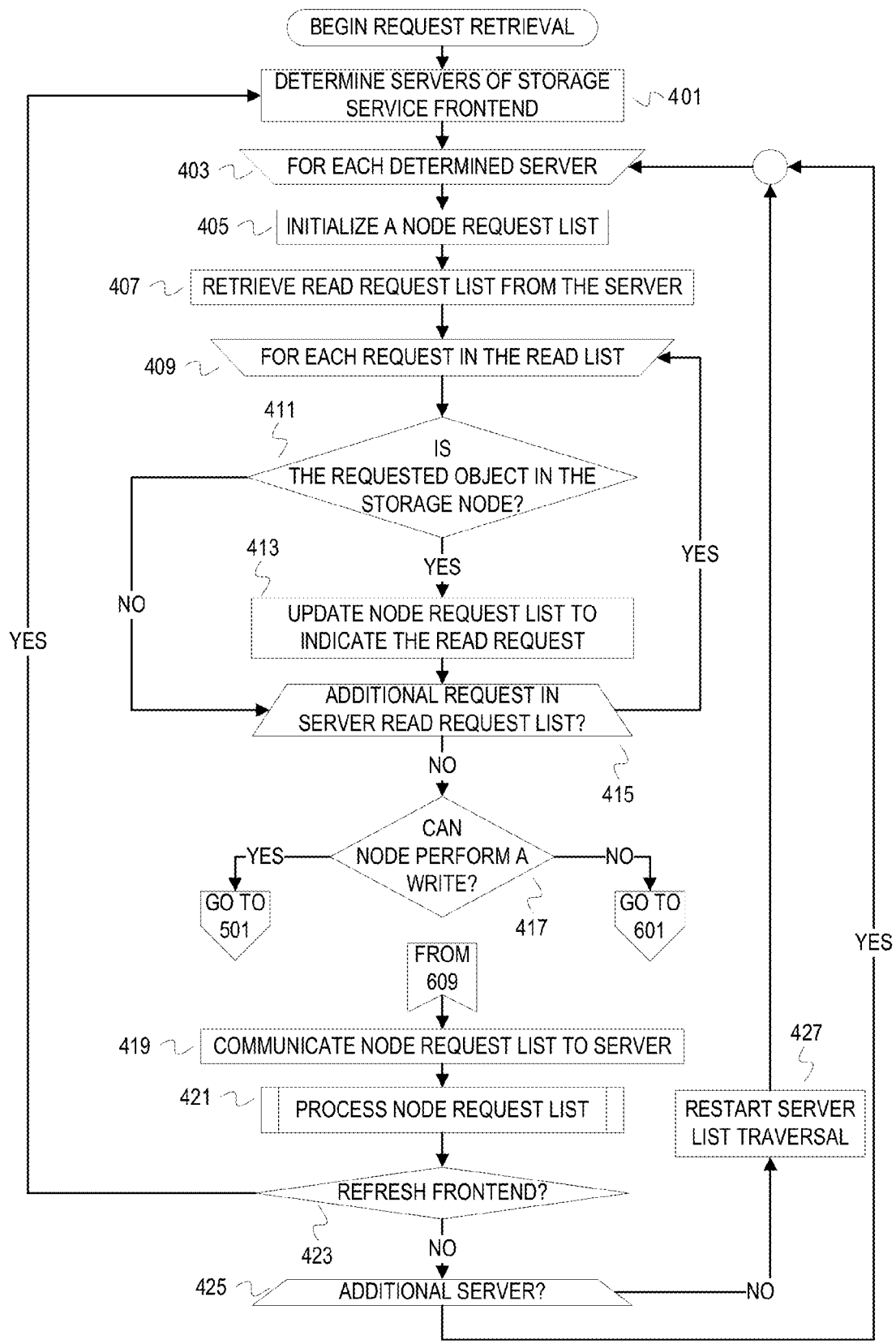
FIG. 4 depicts a flowchart of operations for a backend node of a cloud storage service to retrieve storage service requests from the frontend of the cloud storage service.
Figure 5:
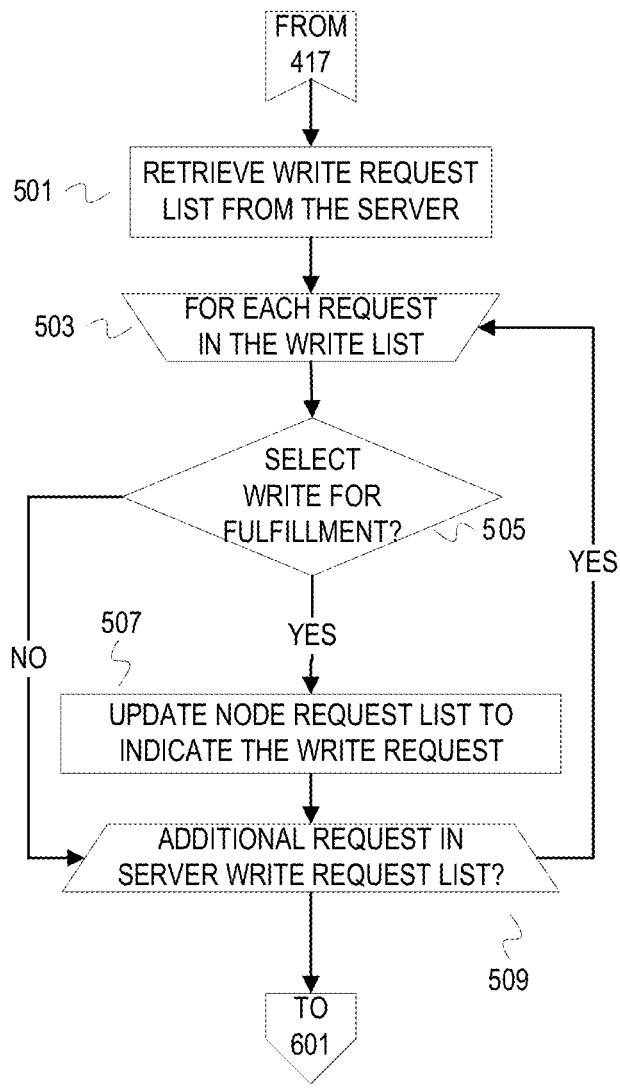
FIG. 5 depicts the example operations for selecting write requests to fulfill by a backend storage node.
Figure 6:
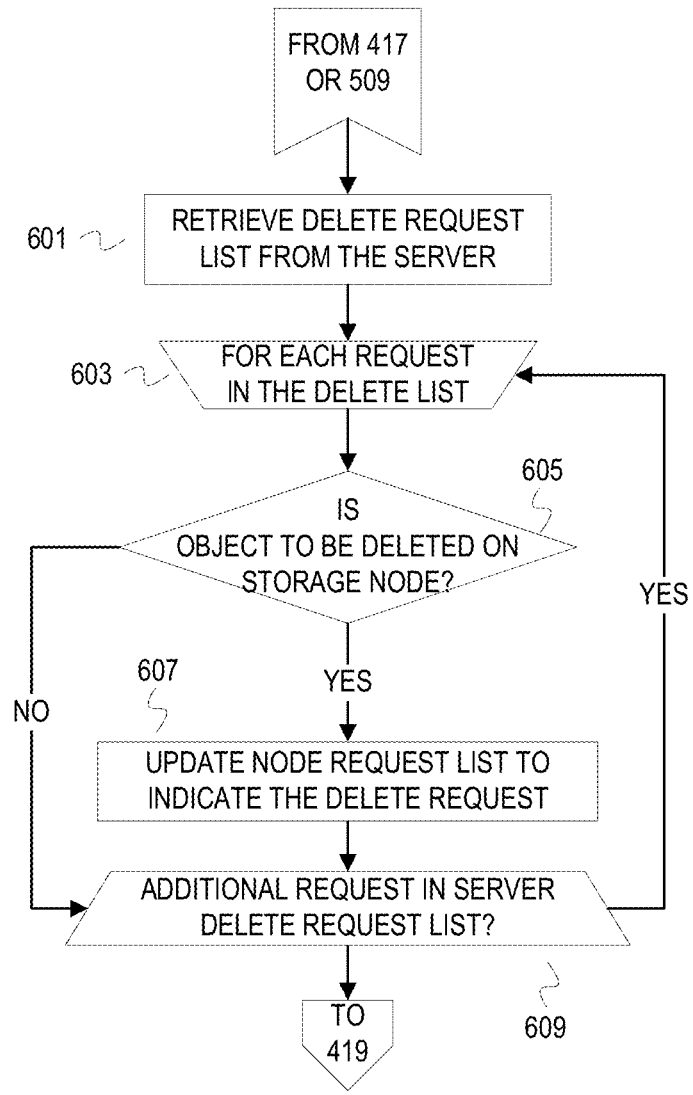
FIG. 6 depicts the example operations for selecting delete requests to fulfill by a backend storage node.
Figure 7:
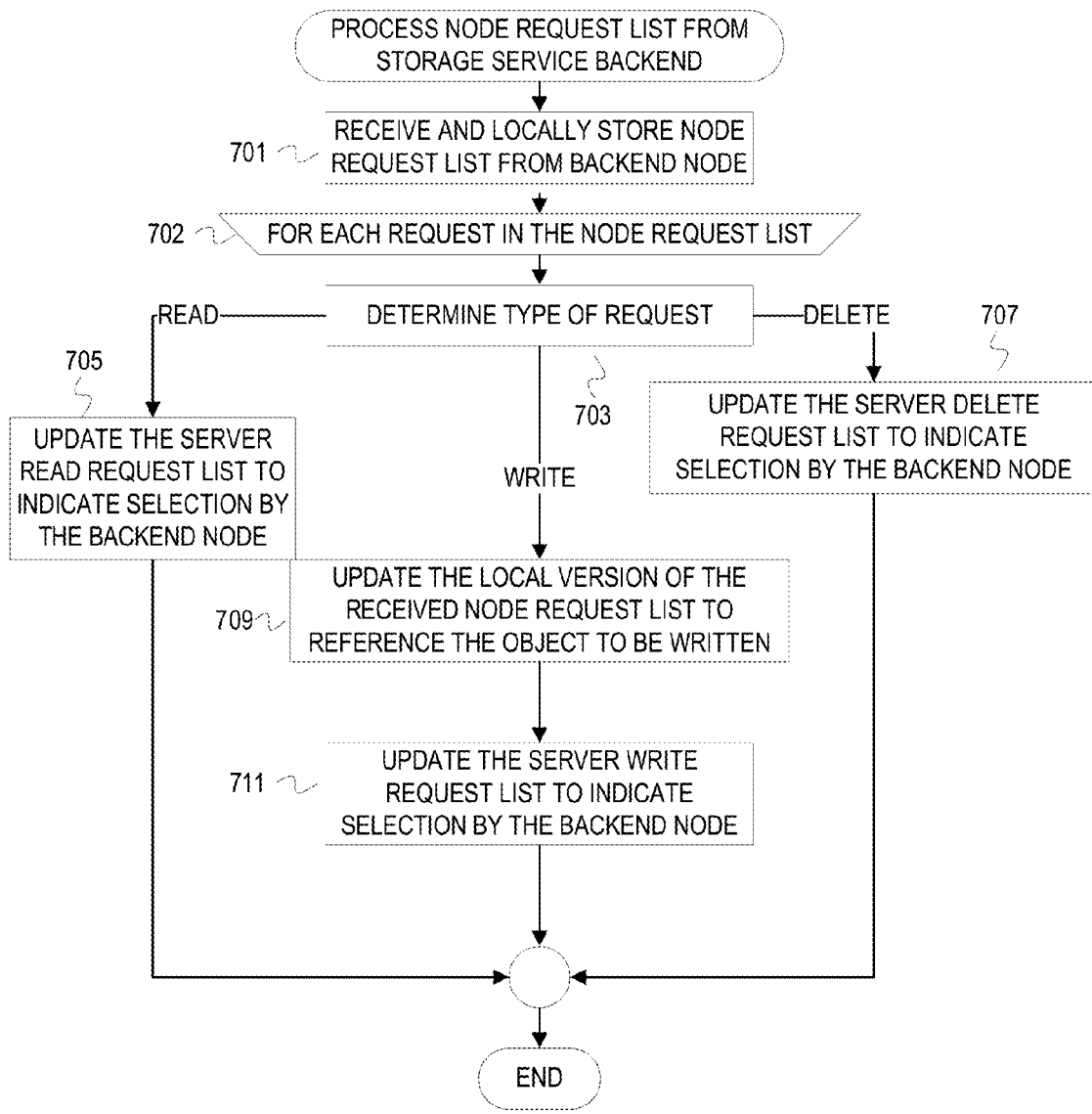
FIG. 7 depicts a flowchart of example operations for a frontend server to process a node request list generated by a storage service backend node.
Figure 8:
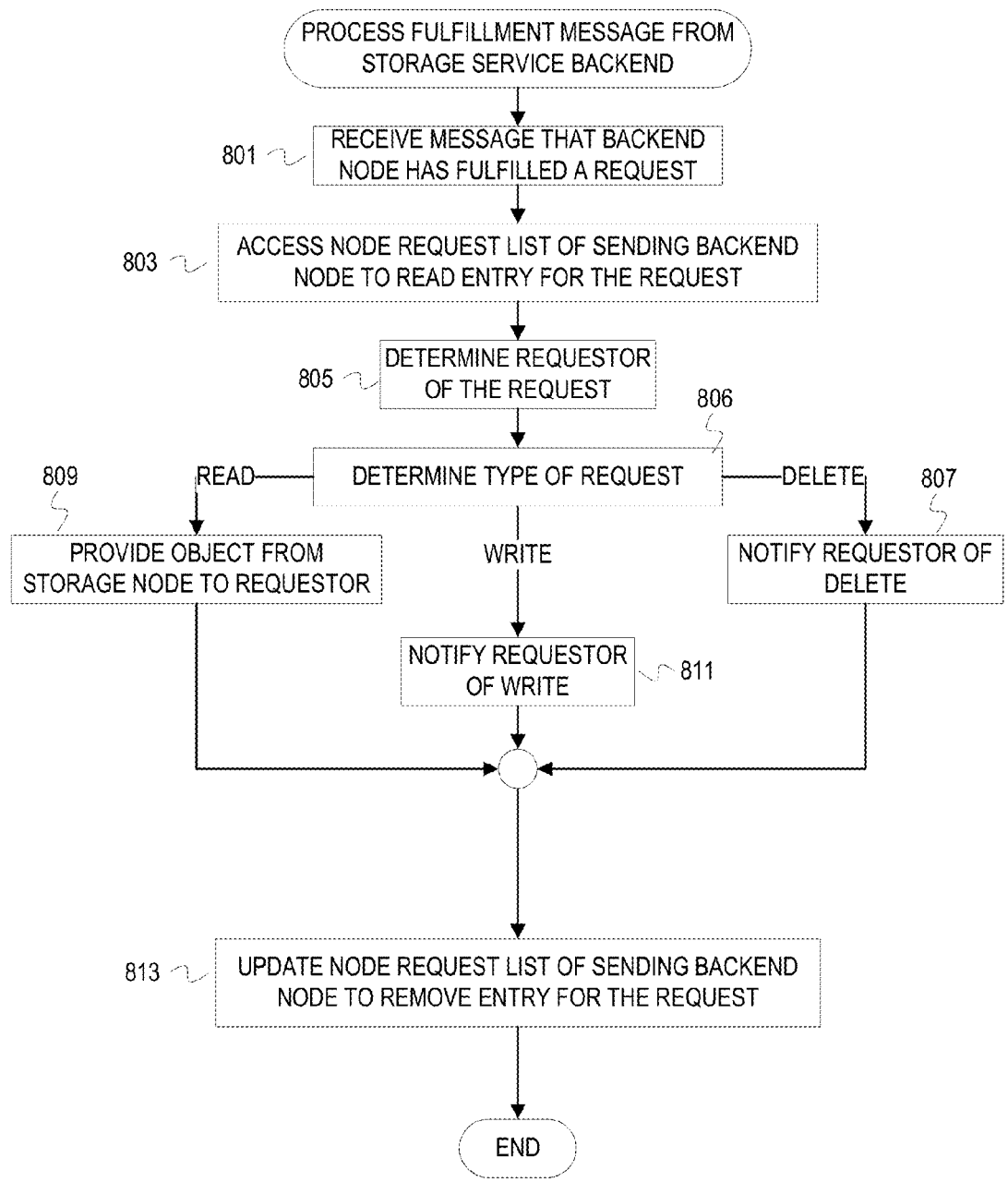
FIG. 8 depicts a flowchart of example operations for a frontend server to process a fulfillment message generated by a backend node.

FIGS. 3-8 depict flowcharts for a self-organizing storage system of a cloud storage service. FIGS. 3 and 7-8 depict flowcharts for servers of a cloud storage service frontend to process service requests from cloud storage service consumers and communications from a cloud storage service backend. FIGS. 3 and 7-8 refer to a server performing the depicted operations. FIGS. 4-6 depict flowcharts for backend nodes to retrieve consumer storage service requests from the cloud storage service frontend. FIGS. 4-6 refer to a backend storage node performing the example operations.

FIGS. 1-2 and the following FIGS. 3-8 refer to "lists." This term is used for efficiency and not intended to limit the disclosure to use of a particular type of data structure. The contents of these lists can be maintained or indicated in a variety of structures and need not be the same. Examples of structures that can be used include a file, a queue, a bucket, a hash table, an array, and a database.

FIG. 3 depicts a flowchart for processing a cloud service consumer storage request. For these example flowcharts, a server maintains lists of received requests by request type. These examples refer to write, read, and delete request types. Aspects of the disclosure can use a different taxonomy for request types (e.g., read, create, update, and delete).

At block 301, a server receives a request for an object. A cloud storage service consumer device can communicate a service request according to CDMI or other storage protocols. For instance, a cloud storage service consumer device can communicate a GET, PUT or DELETE message to the server. The GET or DELETE message can include an identifier for the object to be retrieved or deleted, respectively. The PUT message can include a data object to be written and an identifier for the object.

At block 303, the server determines the type of request received. The determination of request type is used to update the appropriate request list. The server can determine the request type based on the specified operation or metadata of the service request. In some cases, the server may use multiple aspects of a service request (e.g., specified operation and metadata) to determine a request type. Although the server can maintain a mapping from specified operations in the service requests to request types, this is not necessary. For example, the server can maintain a mapping from "GET" to read, or the server can be programmed to select the read list for update if the message includes "GET" in a particular field of the service request. If the request is a read type of request, then control flows to block 305. If the request is a delete type of request, then control flows to block 307. If the request is a write type of request, then control flows to block 309.

At block 305, the server updates a read list to indicate the request to read an object. The server can add an entry to the read list that includes the request and a receipt timestamp. The request itself identifies the object to be read and a requestor. The server can also extract select information from the request and update an entry in the read list with the extracted information. For instance, the server can extract (i.e., read) a requestor identifier, object identifier, and requested operation identifier from the request and insert or add a read list entry with the extracted information.

At block 307, the server updates a delete list to indicate the request to delete an object. The server can add an entry to the delete list that includes the request and a receipt timestamp. Timing information can eventually be used by a backend node to sequentially order fulfillment of requests. The request identifies the object to be deleted and a requestor. Similar to update of the read list, the server can extract select information from the request and update an entry in the delete list with the extracted information. For instance, the server can extract a requestor identifier, object identifier, and requested operation identifier from the request and insert or add a delete list entry with the extracted information.

For a write request, the server locally stores the object to be written and updates the write list. At block 309, the server stores the object to be written into a non-volatile memory/ storage of the server. At block 311, the server updates a write list to indicate the request to write the object and to indicate a reference to the object. If the write request includes the object, then the server can store the object separately from the write list. The server can update the write list with an entry as already described for update of the read list and the delete list. The object can be stored in locally stored in volatile or non-volatile memory. How a server stores the request lists and/or the objects to be written may depend upon the service guarantees of the cloud storage service.

The received requests are time ordered and eventually consistent. The time ordering can be based on time of creation indicated within the requests or time of receipt at the receiving servers. If time of receipt is used, the server can write a timestamp into the entry for a corresponding request. The server can order requests lists according to the temporal information and/or the backend nodes can service the requests according to the temporal information.

Once the request is added to the corresponding list, the server responds to the cloud storage service consumer device to indicate that the servicing of the request is in progress. At block 313, the server communicates a response to the requestor that the request is in process. For example, the server sends a protocol response according to CDMI or another storage protocol. The server can respond to a cloud storage service consumer device with a CDMI "Delayed completion of create" response, or a HTTP message with a status of "202 Accepted." Additionally, an identifier or URL can be provided to allow the client to check on the status of request progress.

FIG. 4 depicts a flowchart of operations performed by a backend node of a cloud storage service to retrieve storage service requests from the frontend of the cloud storage service. As previously mentioned, the servers of the cloud storage service frontend do not attempt to fulfill or assign the received service requests. The backend nodes of the cloud storage service pull the request lists from the frontend and select those that can be fulfilled by the particular backend node.

At block 401, a node identifies servers of a cloud storage service front end. A topology service for the cloud storage service is configured with identifiers (e.g., network addresses) of servers that constitute the storage service front end. The topology service then periodically discovers changes in the server constituency. Servers can be removed from service for maintenance, fail, be added, etc. The topology can push the server constituency information to backend nodes, or the backend nodes can pull this information. The topology service node can push an initial list of constituent servers when the topology service starts and/or at intervals that are longer than intervals for the backend nodes to request or pull this information from the topology service.

At block 403, the node begins to traverse the list of servers that form the cloud storage service frontend. Since cloud storage service consumer devices can submit service requests to different ones of the frontend servers, the backend nodes retrieve requests from the constituent servers for a global view of service requests. Backend nodes can be configured to have affinity for certain frontend servers to address expected or observed request patterns. A backend node may prioritize retrieval by particular attributes. For example, a backend node may prioritize retrieval from frontend servers by geographic proximity of the frontend servers to the backend node and/or by frontend servers receiving a highest number of requests.

At block 405, the node initializes a node request list. The node uses the node request list to indicate requests that the node selects to fulfill. The node initializes a node request list for each server from which it retrieves requests. This presumes that the node will fulfill its selected requests before retrieving requests from the next frontend server. However, aspects of the disclosure may allow a backend node to retrieve requests from a frontend server while fulfilling already retrieved requests and/or allow a backend node to retrieve requests from multiple frontend servers before beginning to fulfill the requests. For these cases, the node can maintain distinct request lists for each frontend server or maintain a request list in which each entry also indicates the corresponding frontend server.

At block 407, the node retrieves a read request list from the server. The node can request the request list using an HTTP based request, for example. The frontend servers can use a consistent naming scheme for the request lists and a consistent path in which the request lists can be found. Alternatively, this can be discovered through the topology service. The frontend servers can also maintain a mapping between the identities of the request lists and a value used by the backend to identify the lists. For example, a backend node can request "LIST1" from a frontend server. The frontend server can be programmed to read a file "readlist" when it receives a request for "LIST1." As another example, the backend node can request "W1" from the frontend server. The frontend server can be programmed to create a database request by index W1 to retrieve write requests from a database of requests maintained by the frontend server, and return the results to the requesting backend node. The node retrieves the read list into local memory or local storage.

At block 409, the node begins traversing the read request list. This can happen while the remainder of the read request list is still being obtained. The node reads an object identifier of the object to be read for each indicated request.

At block 411, the node determines whether the requested object is in the storage node. The node accesses a local storage index that indicates objects stored in the storage media devices of the node. If the object is indicated in the local storage index, then control flows to block 413. Otherwise, control flows to block 415.

At block 413, the node updates the node request list to indicate the read request. The node can update the node request list to indicate a request identifier that is consistent with a request identifier maintained by the frontend server. The node can update the node request list with an identifier of the requesting device, the object identifier, and a timestamp of the request.

At block 415, the node determines whether there is an additional read request in the retrieved read list. If there is an additional read request in the retrieved read list, then control returns to block 409. If there is no additional read request in the retrieved read list, then control flows to block 417.

At block 417, the node determines whether it can perform a write. The node essentially determines whether there is storage space available to accommodate a write. In some cases, a node may no longer have capacity for a write. Aspects of the disclosure can skip this operation and proceed to evaluate individual write requests. If the node can perform a write, then control flows to block 501 of FIG. 5. If the node cannot perform a write, then control flows to block 601 of FIG. 6. In some embodiments, read, write and delete lists can be processed concurrently.

FIG. 5 depicts a continuation of the flowchart of FIG. 4. FIG. 5 depicts the example operations for selecting write requests to fulfill by the node. The example operations of FIG. 5 are similar to those for selecting read requests from a retrieved read request list.

At block 501, the node retrieves a write request list from the server. As with the read request list example, the node can request the request list using an HTTP based request. Similar to the read request list, a cloud storage service provider will configure/program the constituent software/hardware to organize and/or identify the lists in a consistent manner across the frontend and exposed to the backend. The node retrieves the write list into local memory or local storage.

At block 503, the node begins traversing the write request list. The node reads each write request or indication of a write request for information used in determining whether to fulfill the write request. As stated earlier, the node may use size of the object to be written, object type, related services for writing the object, service related conditions for writing the object, etc.

At block 505, the node determines whether to select the write request for fulfillment. The node can evaluate current state of the node, currently pending write requests to be fulfilled, health information for storage media, etc. The node can also be programmed/configured to select write requests based on objects resident on the node. For example, the node can select the write request based on the object to be written sharing a same namespace as a threshold number of resident objects. The metadata of the write request can indicate a path that allows the node to determine the namespace. The node can be programmed/configured to select write requests based on a variety of criteria. If the node selects the write request for fulfillment by the node, then control flows to block 507. If the node does not select the write request, then control flows to block 509.

At block 507, the node updates the node request list to indicate the selected write request. The node can update the node request list to indicate a request identifier that is consistent with a request identifier maintained by the frontend server. The node can update the node request list with an identifier of the requesting device, the object identifier, and a timestamp of the request.

At block 509, the node determines whether there is an additional write request in the retrieved write list. If there is an additional write request in the retrieved write list, then control returns to block 503. If there is no additional write request in the retrieved write list, then control flows to block 601 of FIG. 6.

FIG. 6 depicts a continuation of the flowchart of FIGS. 4 and 5. FIG. 6 depicts the example operations for selecting delete requests to fulfill by the node. The example operations of FIG. 6 are similar to those for selecting read requests from a retrieved read request list.

At block 601, the node retrieves a delete request list from the server. As with the read request list example, the node can request the request list using an HTTP based request. Similar to the read request list, a cloud storage service provider will configure/program the constituent software/hardware to organize and/or identify the lists in a consistent manner across the frontend and exposed to the backend. The node retrieves the write list into local memory or local storage.

At block 603, the node begins traversing the delete request list. The node reads each delete request or indication of a delete request to determine whether it identifies an object residing on the node.

At block 605, the node determines whether the object to delete is in the storage node. The node accesses a local storage index that indicates objects stored in the storage media devices of the node. If the object is indicated in the local storage index, then control flows to block 607. If the local storage index does not indicate the object to be deleted, then control flows to block 609.

At block 607, the node updates the node request list to indicate the delete request. The node can update the node request list to indicate a request identifier that is consistent with a request identifier maintained by the frontend server. The node can update the node request list with an identifier of the requesting device, the object identifier, and a timestamp of the request.

At block 609, the node determines whether there is an additional delete request in the retrieved delete list. If there is an additional delete request in the retrieved delete list, then control returns to block 603. If there is no additional delete request in the retrieved delete list, then control flows to block 419 of FIG. 4.

Returning to FIG. 4, the node has selected the requests to be fulfilled from those requests that have been received by the server. At block 419, the node communicates the node request list to the server. The server updates its own request lists based on the node request list. The server can mark entries in the server request lists to indicate that the requests have already been selected by a backend node or remove the corresponding request entries. The server uses the communicated node request list to track selected requests by backend node. The server can use the node specific request lists to process fulfillment messages from the backend nodes. The server can also use the node specific request lists to restore states of pending requests after a restart or recovery.

At block 421, the node processes the node request list. The node can determine a sequential order for fulfilling the selected requests, or can process multiple requests concurrently. For example, the backend node can write to a first storage device and read from a second storage device concurrently. This can be based on various criteria. For instance, the node can order the selected requests based on timestamps of the selected requests, access patterns (e.g., reading sequential objects), and storage media availability (e.g., time windows for a flash storage bank to be powered on), etc. When the node begins to process a write request, the node obtains the object to be written from the server from which the write request was retrieved. Backend nodes, however, can be programmed/configured to retrieve objects to be written after returning the node request list. When a request has been fulfilled, the node communicates a fulfillment message to the corresponding server. For a read request, the fulfillment message will include or be followed by the requested object data. For write requests, the object data will be requested from the corresponding server. For delete and write requests, the fulfillment message will indicate that the request has been fulfilled and can indicate other information. For example, the fulfillment message can also indicate a timestamp of when the node fulfilled the request.

At block 423, the node determines whether the list of frontend servers should be refreshed. Any of a variety of triggers can be used to cause the node to refresh the list of frontend servers. Examples of triggers include expiration of a time period, completing traversal of the frontend server list, a failure recovery event, etc. If the frontend server list should be refreshed, then control returns to blocks 401. Otherwise, control flows to block 425.

At block 425, the node determines whether there is an additional server in the frontend server list. If there is an additional server, then control returns to block 403. If the node has completed traversal of the frontend server list, then control flows to block 427.

At block 427, the node restarts traversal of the frontend server list and control returns to block 403. The node repeats traversal of the frontend server list since requests can continuously arrive at the frontend. The node can restart traversal according to any of a variety of techniques depending upon implementation of the frontend server list. For example, the node can reset a pointer or counter that corresponds to entries in the frontend server list to restart traversal. In addition, the node can traverse the frontend server list in a different order.

FIG. 7 depicts a flowchart of example operations for a frontend server to process a node request list from a storage service backend node. As depicted earlier, backend nodes will communicate node specific request lists or node request lists to the server. A node request list indicates the requests selected by a backend node to be fulfilled by the backend node. The request lists by type and the request lists by backend node allow the server to distinguish between service requests that have been selected for fulfillment by the backend and those that have not yet been selected.

At block 701, the server receives a node request list from a backend node and locally stores the node request list. The server stores each of the node request lists to track requests that have been selected for fulfillment by storage backend nodes. The messaging between the frontend and the backend of the cloud storage service can conform to a HTTP based messaging protocol, such as CDMI.

At block 702, the server begins to traverse the node request list. The server traverses the node request list to update the server request lists.

At block 703, the server determines the type of the request in the node request list. Although the updates operations will be similar, the server will select the appropriate corresponding server request list based on the request type.

If the request is a read request that has been selected for fulfillment, then the server updates the server read request list to indicate selection of the request by the backend node at block 705. If the request is a delete request that has been selected for fulfillment, then the server updates the server delete request list to indicate selection of the request by the backend node at block at block 707. To update a server request list, the server can remove the selected request from the appropriate server request list or mark the entry as selected by a backend node.

If the request is a write request that has been selected for fulfillment, then the server updates the local version of the received node request list to reference the object to be written at block 709. Since the server will use the node request list instead of the server write request list to track the selected write request, the server associates the object to be written with the node request list. At block 711, the server updates the server write request list to indicate selection of the request by the backend node.

FIG. 8 depicts a flowchart of example operations for a frontend server to process a fulfillment message from a backend node. Although the storage service interface is asynchronous and the cloud storage service provider is likely not bound to providing a response in a relatively short time period, the cloud storage service provider still provides a response at some point in time. The frontend server processes fulfillment messages and returns responses to cloud storage service consumers accordingly.

At block 801, the server receives a message from a backend node that the backend node has fulfilled a request. As previously stated, the messaging between the frontend and the backend of the cloud storage service can conform to a HTTP based messaging protocol, such as CDMI.

At block 803, the server accesses the node request list corresponding to the sending backend node. The server can index the node request lists by backend node identifiers. The server accesses the node request list to read the entry that corresponds to the fulfilled request.

At block 805, the server determines a requestor of the request with the node request list entry that corresponds to the fulfilled request. Either the request or information extracted from the request will include a network address of a cloud storage service consumer device.

At block 806, the server determines the type of request that has been fulfilled by the backend node. If the request type is a read, then the backend node will have also provided the requested object. At block 809, the server provides the object requested for reading to the requestor. If the request type is a delete, then the server notifies the requestor that the delete request has been fulfilled at block 807. If the request type is a write, then the server notifies the requestor that the write request has been fulfilled at block 811.

At block 813, the server updates the node request list of the sending backend node to remove the request entry. The server can remove the entry from the node request list since the request has been fulfilled and the requestor has been notified accordingly.

The backend nodes can fulfill selected requests according to different paradigms. A backend node may wait to communicate fulfillment of requests until a threshold number of requests have been fulfilled from the node's list of selected requests. A backend node may communicate fulfillment as each request is fulfilled. A backend node can communicate fulfillment of a delete request with a value that indicates successful deletion or deletion fulfillment along with the request identifier and/or deleted object identifier. A backend node can communicate fulfillment of a write request with a value that indicates write success or write fulfillment along with the request identifier and/or identifier of the written object. For a read request, the backend node at least communicates the object that has been read. When a read request has been fulfilled by a backend node, the server that receives the read object can update the node specific list at the server to reference the read object received from the backend node.

An asynchronous interface for a self-organizing storage system can support client progress requests. A cloud consumer device can periodically communicate a message that indicates a particular request previously submitted to a server, and a value (e.g., flag in a reserved field or status type in message header) that indicates the message as a progress request. If the request has not been selected yet, then the server can again respond with an in progress or accepted type of response. If the request has been selected for fulfillment, then the server can access the node specific list to determine whether the indicated request has been fulfilled yet. If so, then the server can respond with a confirmation or the object if the request is a read request. If the request has been selected for fulfillment but is still in progress, then the server can again respond with a response indicating "in progress" or "request accepted."

Variations

In the above example illustrations, cloud storage service backend nodes process read requests before write requests, and process delete requests last. This is an example prioritization based on a presumption that reads can be more time sensitive than write requests and write requests are more time sensitive than delete requests. Aspects of the disclosure can program backend nodes to retrieve lists in a different order and/or can configure backend nodes to retrieve lists concurrently from a server. Furthermore, aspects of the disclosure can maintain a request list at each frontend server that indicates requests regardless of type. The backend nodes can then retrieve a single list instead of multiple lists. Maintaining a request list that hosts all types of requests can lead to a larger request list and can increase the chances of backend nodes blocking each other when retrieving the request list.

Although selection of read and delete requests are dependent upon location of the corresponding objects, backend nodes can compete for write requests. Since a write request may not be bound to a particular backend node, multiple backend nodes can select a write request. With servers maintaining request lists by type, the servers can use a locking mechanism on the write lists to prevent multiple backend nodes from selecting the same write request. If the frontend allows for multiple nodes of the backend to fulfill a same write request due to race conditions (e.g., multiple backend nodes select a write request before the request is moved to node specific lists), then the frontend can disregard the latest write fulfillment and issue a delete/rollback to the later backend node(s) in response.

In addition, backend nodes can obtain the request list(s) from frontend servers according to different techniques. The previous examples illustrate backend nodes retrieving request lists from frontend servers. However, the frontend servers can push the request lists to backend nodes. The frontend servers would not assign requests to backend nodes, the frontend servers would communicate the request lists to the backend nodes. For example, each of the frontend servers can multicast the request lists to backend nodes discovered from the topology service. As another example, each frontend server can communicate its request lists to a subset of known backend nodes in different time intervals and progress through the remaining backend nodes deterministically (e.g., rolling time intervals, based on time of day, etc.) or dynamically (e.g., depending upon current response times from backend nodes, depending upon resource costs, etc.).

A self-organizing storage system for a cloud storage service also provides different recovery mechanisms. Although a failed frontend server may lose the server request lists and the node request lists maintained at the frontend server, the backend nodes will still continue fulfilling previously selected requests. When the backend nodes communicate fulfillment messages to the frontend server, the frontend server can still notify requestors of the fulfilled requests despite the loss of the information at the frontend server. For the backend nodes, a backend node can poll frontend servers at startup or after recovery for any node request lists previously communicated by the backend node. The backend node can then begin processing node request lists returned by the frontend servers.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the flowchart that spans FIGS. 4-6 can include additional operations to determine whether a request is marked as selected if the server does not remove selected requests from the request lists. In addition, the flowcharts do not account for streaming the lists to the backend nodes. A backend node can establish a connection or session with one or more frontend servers and "stream" a request list or request lists. "Streaming" a request list means a backend node can receive a request list at a granularity other than the entire request list. For example, a backend node can receive packets according to a communication protocol and form a request list entry when sufficient packets have been received. Information from packet headers or payloads can define when sufficient packets have been received (e.g., fixed size for each request list entry, flags or values indicating beginning or ending of list entries, etc.). Furthermore, backend nodes can obtain less than entire request lists. Whether being pushed or pulled, a backend node can obtain a subset of requests in a list or be limited to accessing a subset of requests. For example, a frontend server may filter lists or flag list entries based on the type of storage media of a backend node in response to a request for a list from a backend node. Requests lists can may be filtered for a backend node based on object attribute (e.g., size, data type, etc.). A frontend server or a backend node can filter lists or selectively choose from lists based on one criterion or multiple criteria. Both a frontend server and a backend node can filter based on different criteria. For instance, a frontend node can filter requests to be provided to a backend node based on the storage media type or geographic location of a backend node, and the backend node can specify to the frontend server an object property for further filtering or requests. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 9:
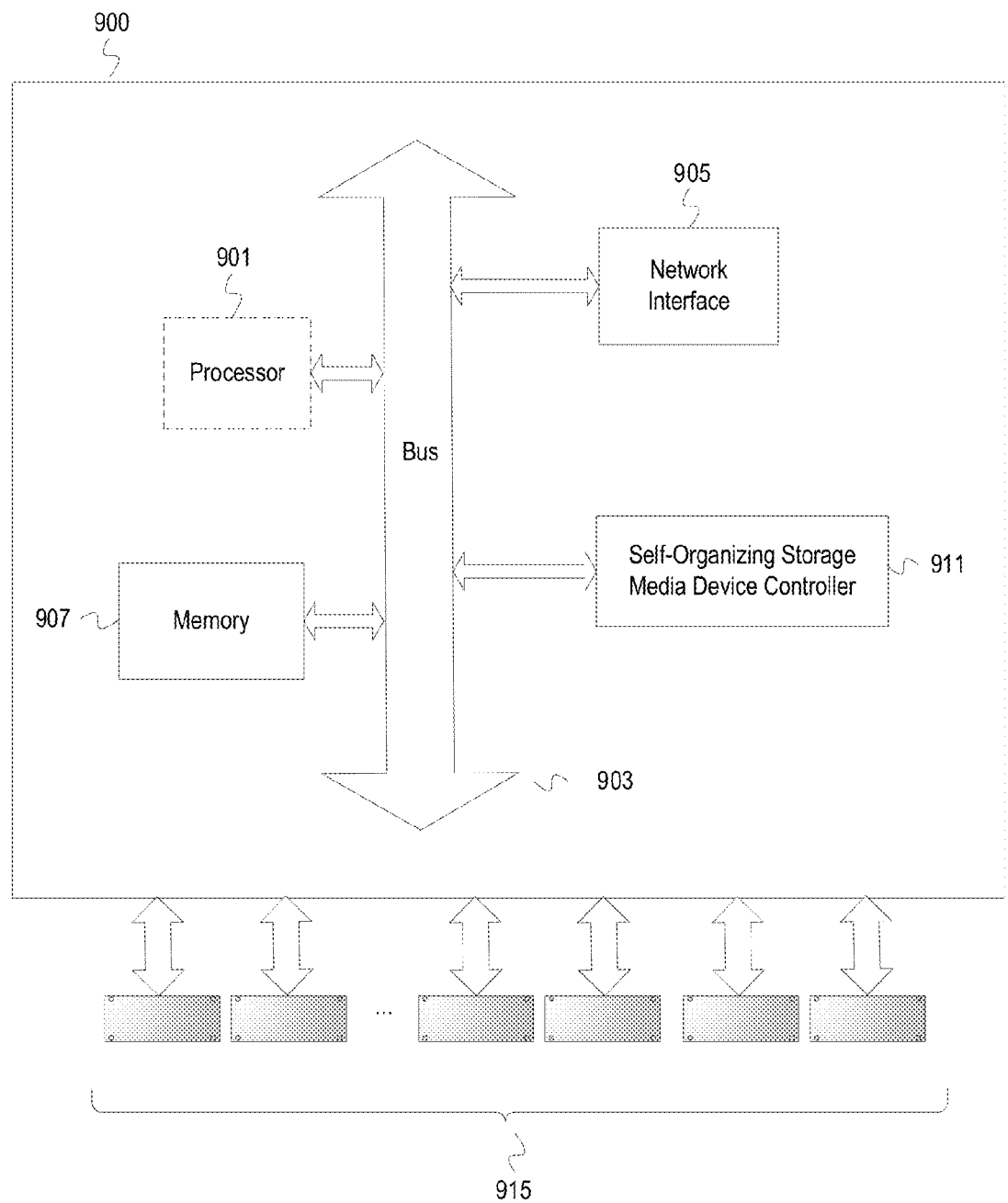
FIG. 9 depicts an example cloud storage service backend storage node with a self-organizing storage media device controller.

FIG. 9 depicts an example cloud storage service backend node with a self-organizing storage media device controller. A backend node includes a control board 900 and a plurality of storage media devices 915 connected to the control board 900. The plurality of storage media devices 915 may be solid storage devices, an array of disk drives, a hybrid of different storage media devices, etc. The control board 900 includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The control board 900 also includes a bus 903 (e.g., PCI, ISA, PCI-Express, HyperTransport® bus, InfiniBand® bus, NuBus, etc.) and a network interface 905 (e.g., a Fiber Channel interface, an Ethernet interface, an internet small computer system interface, SONET interface, wireless interface, etc.). The system also includes a self-organizing storage media device controller 911. The self-organizing storage media device controller 911 retrieves request lists from a frontend server and selects requests to fulfill based on a local storage index and possibly additional information about the backend node. The controller 911 can be a programmed field programmable gate array. The backend node can also include a processor unit 901 (possibly including multiple processors, multiple cores, multiple nodes, and/or implementing multi-threading, etc.). Any one of the previously described functionalities may be partially (or entirely) implemented in hardware and/or on the processor 901. Further, realizations may include fewer or additional components not illustrated in FIG. 9 (e.g., video cards, audio cards, additional network interfaces, peripheral devices, etc.). The controller 911 and the network interface 905 are coupled to the bus 903.

While the aspects of the disclosure are described with reference to various implementations and exploitations, it will be understood that these aspects are illustrative and that the scope of the claims is not limited to them. In general, techniques for a cloud storage service storage system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   maintaining, by a frontend node of a storage service, a first data structure having indications that reference objects of storage service requests received at the frontend node;
   obtaining the indications of a first set of the storage service requests from the frontend node by a backend node of the storage service;
   selecting, by the backend node, storage service requests to fulfill from the obtained indications of the first set of storage service requests based, at least in part, on an index of objects stored at the backend node;
   communicating, to the frontend node from the backend node, a third data structure having the obtained indications of the selected storage service requests;
   updating, by the frontend node, a second data structure based on the communicated indications of the third data structure from the backend node, the second data structure corresponding to the backend node; and
   communicating, to the frontend node from the backend node, fulfillment of the selected storage service requests.

2. The method of claim 1, further comprising:
   in response to receiving communication of fulfillment of one or more of the selected storage requests, at the frontend node, notifying a corresponding requestor of the fulfillment of the one or more selected storage requests.

3. The method of claim 1, wherein the backend node communicates fulfillment of the selected storage service requests as each is fulfilled by the backend node.

4. The method of claim 1, further comprising the backend node arranging the selected storage service requests for fulfillment based, at least in part, on an operational attribute of the backend node.

5. The method of claim 1, further comprising the backend node retrieving from the frontend node an object referenced by one or more of the obtained indications in the first set of the storage service requests.

6. The method of claim 1, wherein the first data structure includes write request type storage service requests, and wherein the frontend node maintains additional data structures for different types of storage service requests.

7. The method of claim 1, wherein updating, by the frontend node, the second data structure based on the communicated indications of the third data structure by the backend node further comprises:
   removing the storage service requests corresponding to the communicated indications of the third structure from the second data structure.

8. The method of claim 1, further comprising:
   obtaining indications, by the backend node, of a second set of storage service requests from a different server of the frontend node than from a server having the first set of storage service requests;
   selecting, at the backend node, storage service requests to fulfill from the second set of storage service requests based, at least in part, on the index of objects; and
   communicating, to the different server from the backend node, the obtained indications of the storage service requests selected by the backend node from the second set of storage service requests.

9. The method of claim 8, wherein the backend node obtains the indications of the second set of storage service requests after expiration of a defined time period after obtaining the indications of the first set of storage service requests.

10. The method of claim 1 further comprising:
    obtaining, by a different backend node, indications of a second set of storage service requests from the frontend node, wherein the second set of storage service requests includes storage service requests not selected by the backend node;
    selecting, at the different backend node, storage service requests to fulfill from the second set of storage service requests based, at least in part, on a different index of objects stored at the different backend node; and
    communicating, to the frontend node from the different backend node, the indications of the storage service requests selected by the different backend node.

11. A non-transitory machine-readable medium comprising machine executable instructions for a storage system of a cloud storage service, the instructions to:
    maintain a first data structure having indications that reference objects of storage service requests received in a frontend node of the cloud storage service;
    maintain a second data structure corresponding to a backend node of the cloud storage service, wherein the second data structure includes entries from the first data structure with indications that reference objects of storage service requests for fulfillment by the backend node;
    update the first data structure to mark storage service requests to be fulfilled by the backend node;
    periodically communicate the first data structure from the frontend node to the backend node;
    select, at the backend node, storage service requests to fulfill in the backend node from the storage service requests indicated in the communicated first data structure based, at least in part, on a backend index of objects stored at the backend node;

communicate the selected storage service requests as a third data structure to the frontend node; and mark, at the frontend node, in the second data structure the communicated selected storage service requests from the third data structure as being fulfilled.

12. The non-transitory machine-readable medium of claim 11, wherein the first data structure includes entries for read, write and delete type of storage service requests.

13. The non-transitory machine-readable medium of claim 11, wherein the instructions to select storage service requests to fulfill further comprise instructions to select a delete type of storage service requests and a read type of storage service requests that identify objects in the backend index of objects stored at the backend node.

14. The non-transitory machine-readable medium of claim 11, wherein the instructions to select storage service requests to fulfill further comprises instructions to select write type storage service requests based on at least one of backend characteristics information and backend operational attribute information.

15. A storage system comprising:

a server including a processor and a machine-readable medium with instructions stored thereon, the instructions executable by the processor to cause the server to, maintain a first data structure to indicate storage service requests received at the server;

maintain a set of one or more second data structures received from one or more storage nodes, wherein the set of one or more second data structures indicates storage service requests selected, by a corresponding storage node, from storage service requests indicated in the first structure;

update the first data structure to remove indications of storage service requests included in the set of one or more second data structures; and each of the storage nodes including one or more storage devices, a network interface, and programmed to, obtain, periodically via the network interface, the first data structure from the server;

select storage service requests to fulfill from the storage service requests indicated in the first data structure, the selection based, at least in part, on an index of objects stored at the respective storage node;

indicate selected storage service requests in a third data structure;

communicate the third data structure to the server; and attempt to fulfill the selected storage service requests.

16. The storage system of claim 15, wherein the first data structure at the server includes read, write and delete types of requests.

17. The storage system of claim 15, wherein each storage node programmed to select storage service requests to fulfill is further programmed to select delete type storage service requests and read type storage service requests that identify objects indicated in the index of objects of the respective storage node.

18. The storage system of claim 15, wherein each storage node programmed to select storage service requests to fulfill is further programmed to select write type storage service requests based on at least one of information about a characteristic of the respective storage node and information about an operational attribute of the respective storage node.

19. The storage system of claim 15, wherein the machine-readable medium of the server further comprises instructions executable by the processor to cause the server to respond to a requestor for a corresponding storage service request upon receiving an indication from one or more of the storage nodes that the corresponding storage service request has been fulfilled.

* * * * *